(12) United States Patent
Mochizuki et al.

(10) Patent No.: US 8,256,561 B2
(45) Date of Patent: Sep. 4, 2012

(54) VEHICLE

(75) Inventors: Shigehiro Mochizuki, Shizuoka-ken (JP); Kazutaka Fukuda, Shizuoka-ken (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 528 days.

(21) Appl. No.: 11/735,896

(22) Filed: Apr. 16, 2007

(65) Prior Publication Data
US 2008/0251301 A1 Oct. 16, 2008

(51) Int. Cl.
*B60K 5/00* (2006.01)
*B60K 5/02* (2006.01)
*B60K 8/00* (2006.01)

(52) U.S. Cl. ........ 180/291; 180/292; 180/295; 180/299; 123/195 R

(58) Field of Classification Search ............... 123/195 R
See application file for complete search history.

(56) References Cited

U.S. PATENT DOCUMENTS

| | | | | |
|---|---|---|---|---|
| 2,138,618 A * | 11/1938 | Seyerle | ......................... | 180/54.1 |
| 2,218,332 A * | 10/1940 | Fowler | ............................... | 74/44 |
| 2,237,369 A * | 4/1941 | Seyerle | ......................... | 180/291 |
| 2,469,117 A * | 5/1949 | Kiekhaefer | .................... | 123/55.6 |
| 3,150,543 A * | 9/1964 | Danganthier | .................. | 475/200 |
| 3,561,416 A * | 2/1971 | Kiekhaefer | ................. | 123/193.3 |
| 3,613,816 A * | 10/1971 | Gutbrod | ......................... | 180/53.1 |
| 4,655,309 A * | 4/1987 | Imaizumi et al. | ............. | 180/215 |
| 4,669,565 A * | 6/1987 | Miki et al. | .................. | 180/89.12 |
| 4,685,428 A | 8/1987 | Inagaki et al. | | |
| 4,869,332 A * | 9/1989 | Fujita et al. | .................. | 180/65.2 |
| 5,012,775 A | 5/1991 | Oike | | |
| 5,024,113 A * | 6/1991 | Ito et al. | ............................... | 74/6 |
| 5,699,872 A * | 12/1997 | Miyakawa et al. | ........... | 180/291 |
| 6,305,488 B1 * | 10/2001 | Montineri | ...................... | 180/374 |
| 6,357,545 B1 * | 3/2002 | Hori et al. | ...................... | 180/219 |
| 6,632,144 B1 * | 10/2003 | Narita et al. | ................... | 464/179 |
| 6,712,172 B2 * | 3/2004 | Shimada et al. | ............... | 180/292 |
| 6,799,485 B1 * | 10/2004 | Kawamoto et al. | ............. | 74/335 |
| 7,490,694 B1 * | 2/2009 | Berg et al. | ...................... | 180/326 |
| 2003/0005905 A1 * | 1/2003 | Matsuto et al. | ............ | 123/197.1 |
| 2003/0217724 A1 | 11/2003 | Hattori et al. | | |
| 2004/0216942 A1 * | 11/2004 | Tanaka et al. | ................. | 180/292 |
| 2005/0173177 A1 | 8/2005 | Smith et al. | | |
| 2005/0217618 A1 * | 10/2005 | Watanabe et al. | ............ | 123/78 F |
| 2006/0254849 A1 * | 11/2006 | Kalsnes et al. | ................ | 180/292 |
| 2006/0283418 A1 * | 12/2006 | Matsuda et al. | ............ | 123/197.1 |
| 2007/0227793 A1 * | 10/2007 | Nozaki et al. | ................ | 180/68.3 |
| 2007/0240927 A1 * | 10/2007 | Kitai et al. | .................... | 180/312 |
| 2007/0267240 A1 * | 11/2007 | Inui et al. | ...................... | 180/291 |

FOREIGN PATENT DOCUMENTS

| | | | |
|---|---|---|---|
| DE | 4001437 A1 * | 7/1991 | |
| JP | 60116825 A | 6/1985 | |
| JP | 02144279 A | 6/1990 | |
| JP | 2004278453 A | 10/2004 | |

* cited by examiner

*Primary Examiner* — J. Allen Shriver, II
*Assistant Examiner* — Chiedu Chibogu
(74) *Attorney, Agent, or Firm* — Keating & Bennett, LLP

(57) ABSTRACT

In one aspect, the vehicle is a relatively small-sized utility vehicle and includes front and rear wheels on the right and left sides of a body of the vehicle. A seat is located substantially midway between the front and rear wheels. At least part of a power unit is disposed in the space under the seat. The power unit includes an engine having a crank shaft and a transmission to which power is input from the output portion of the engine through a first power train. The crank shaft includes a rotational mass, and at least a portion of the transmission is located in the space below a swept area of the rotational mass.

21 Claims, 11 Drawing Sheets

[Fig. 1]
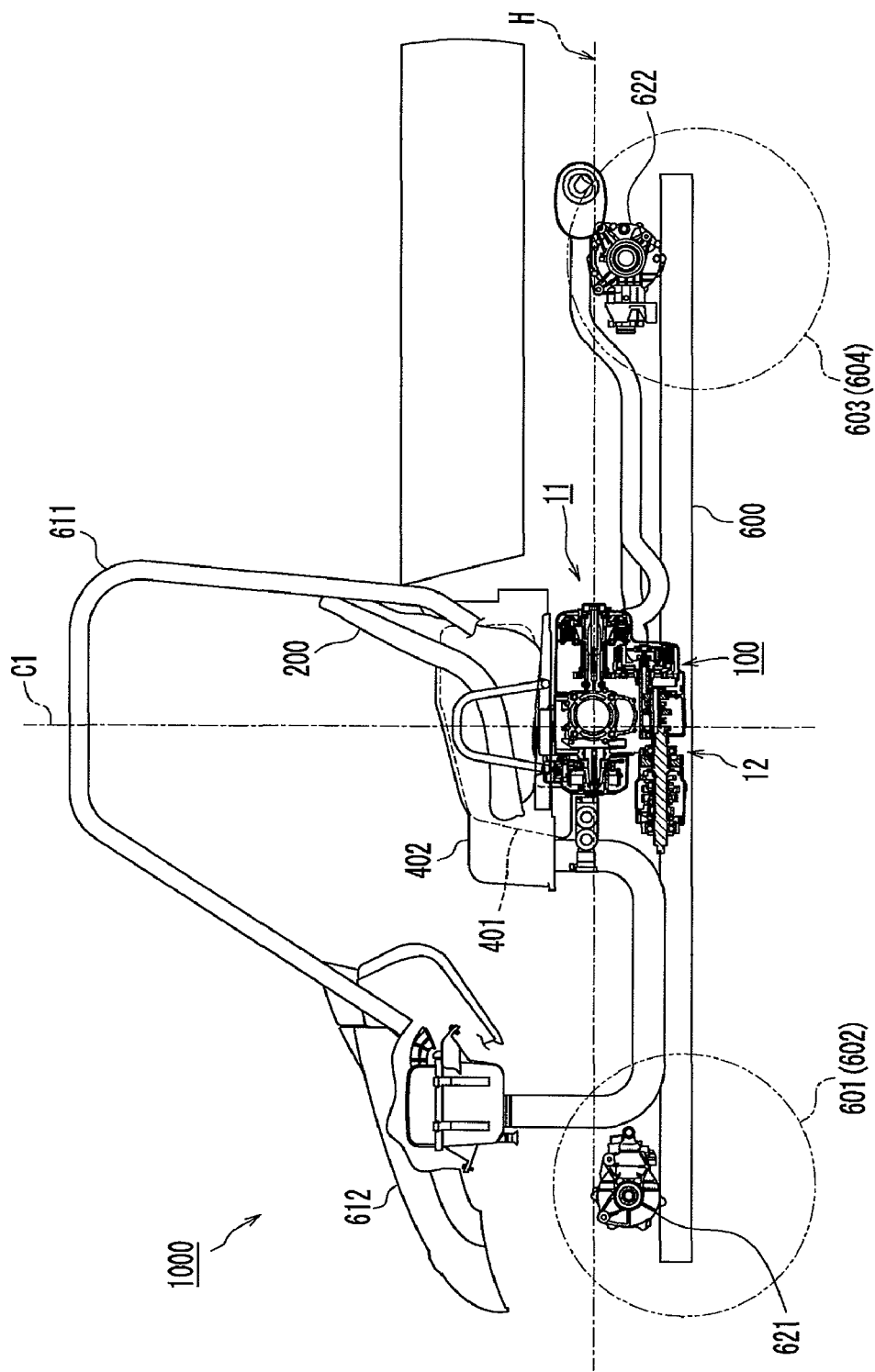

[Fig. 2]
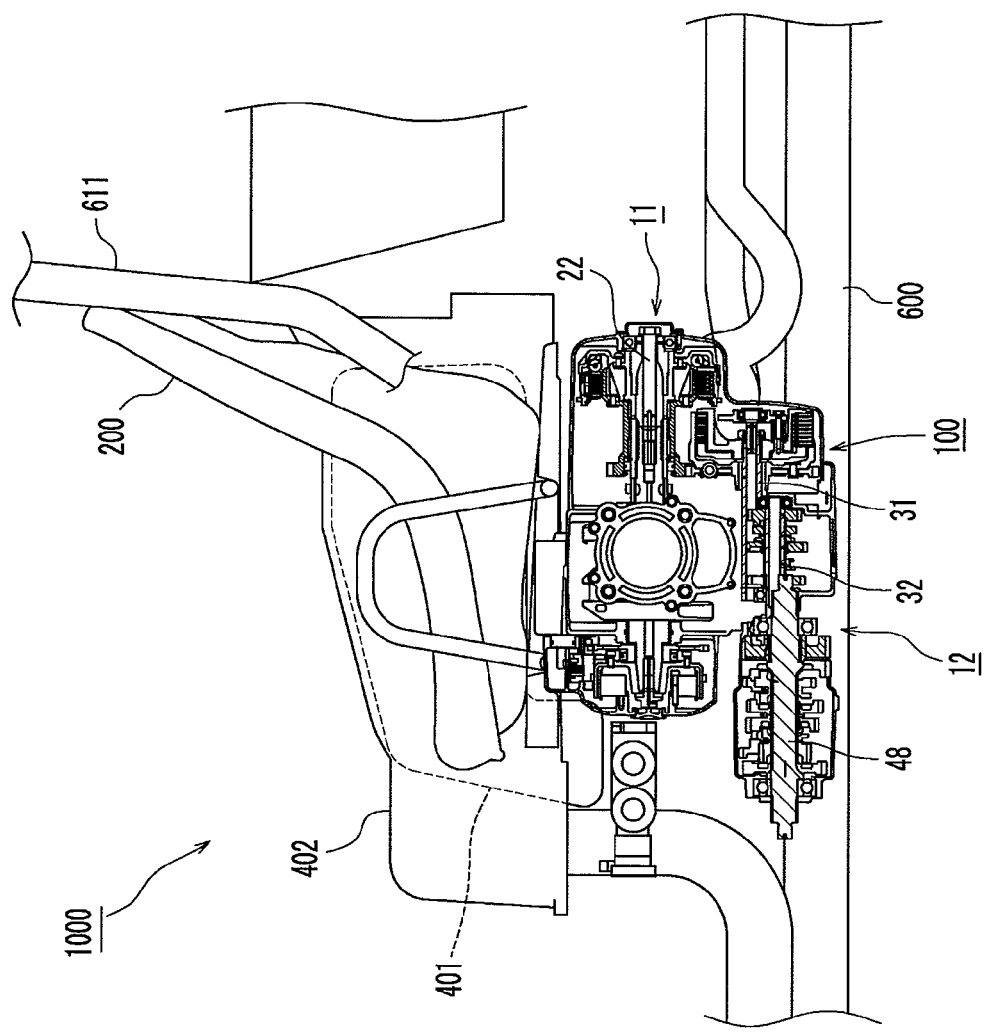

[Fig. 3]
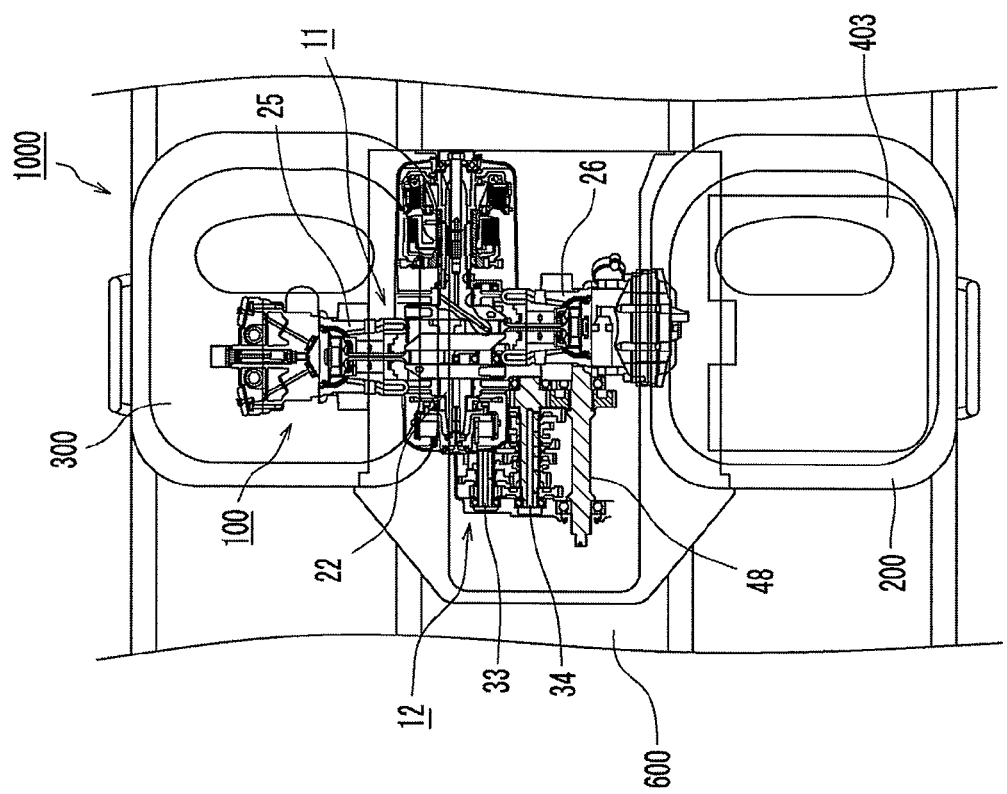

[Fig. 4]
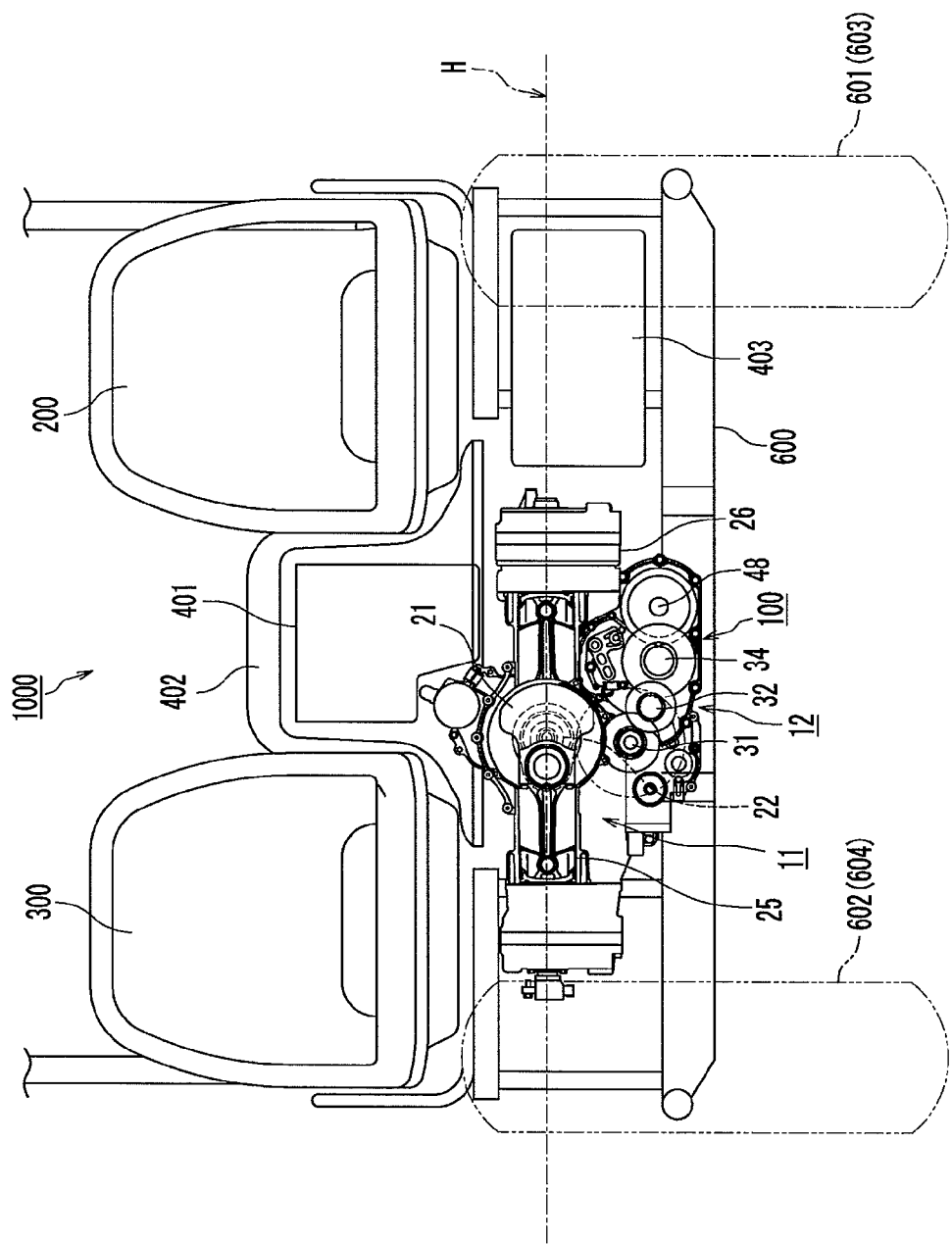

[Fig. 5]
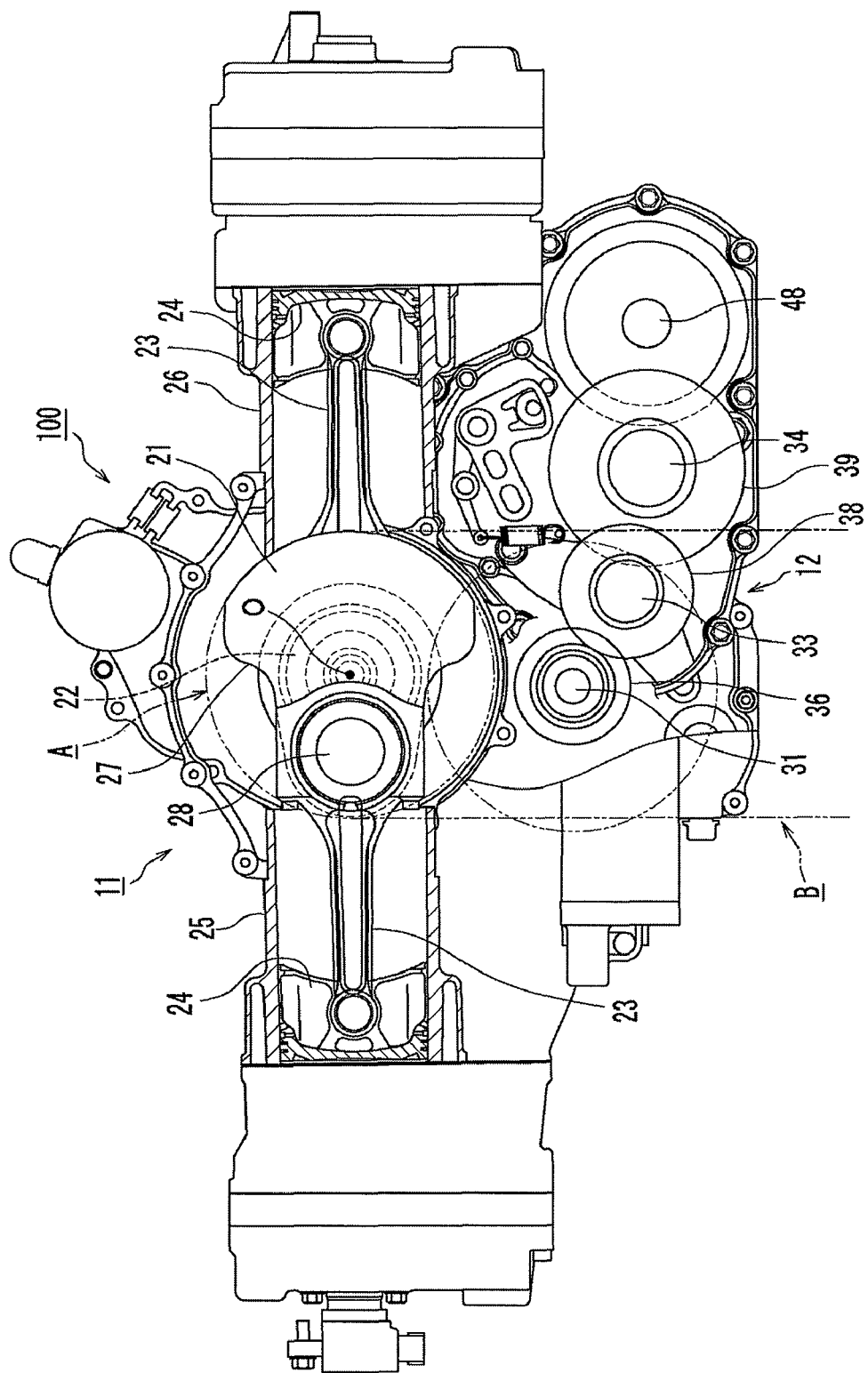

[Fig. 6]
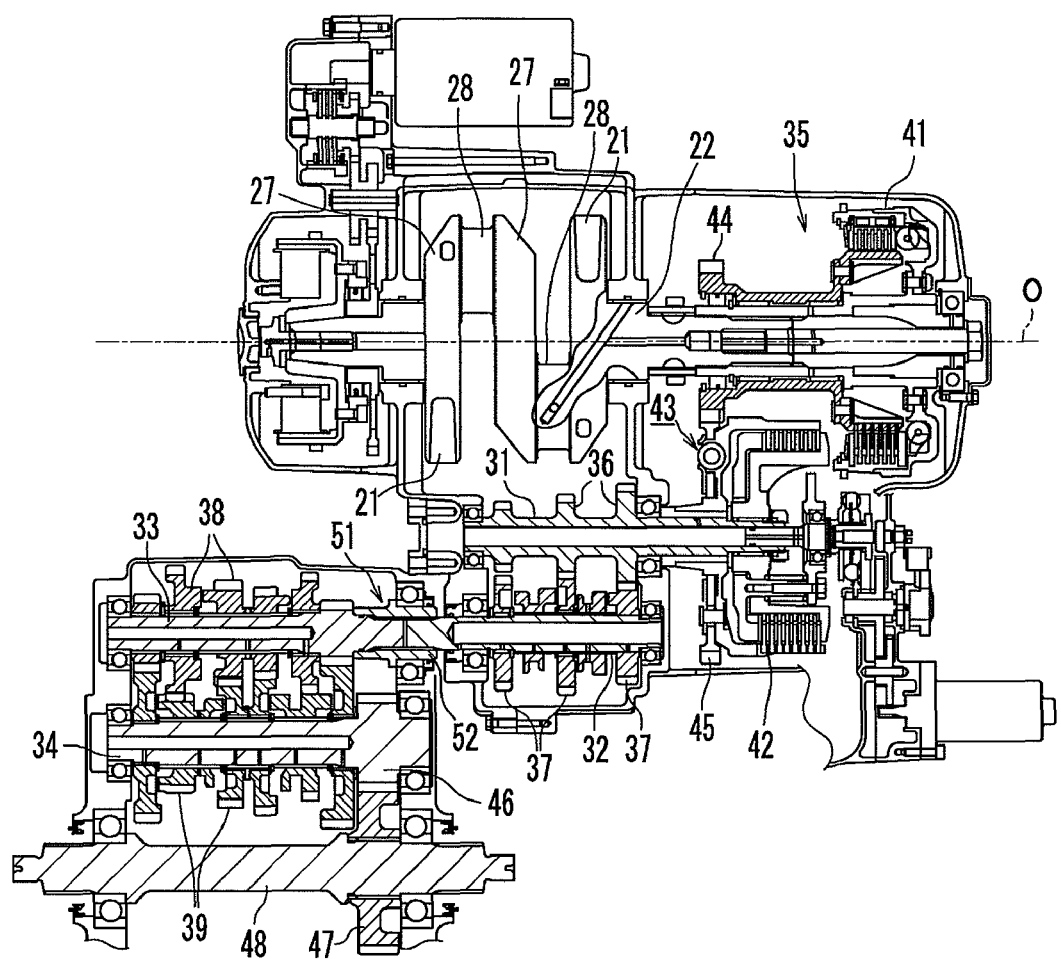

[Fig. 7]
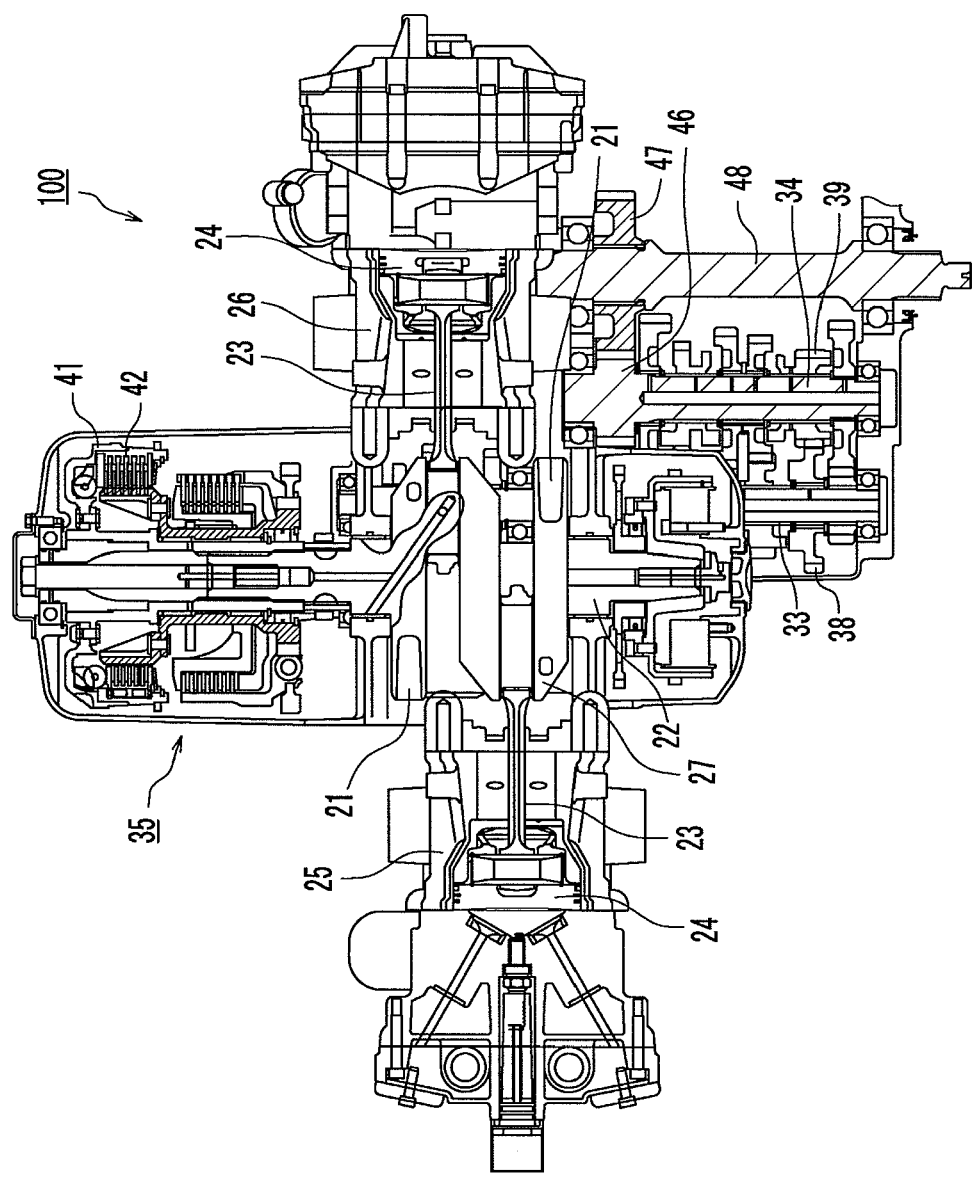

[Fig. 8]
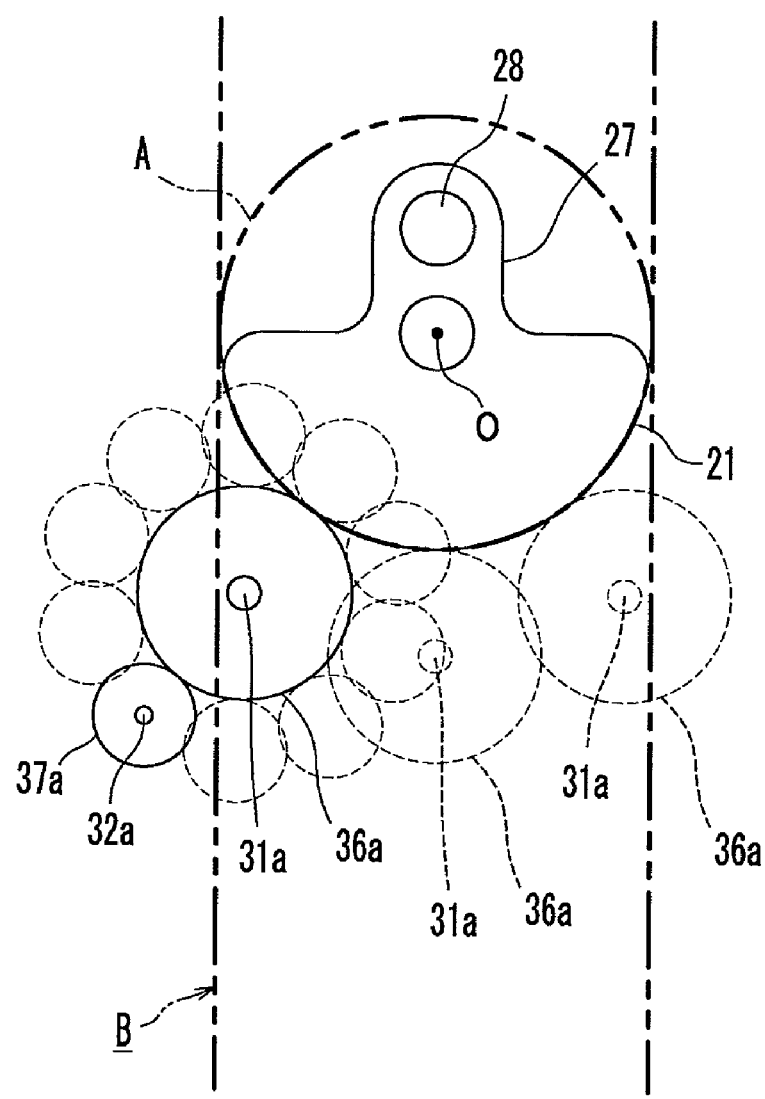

[Fig. 9]
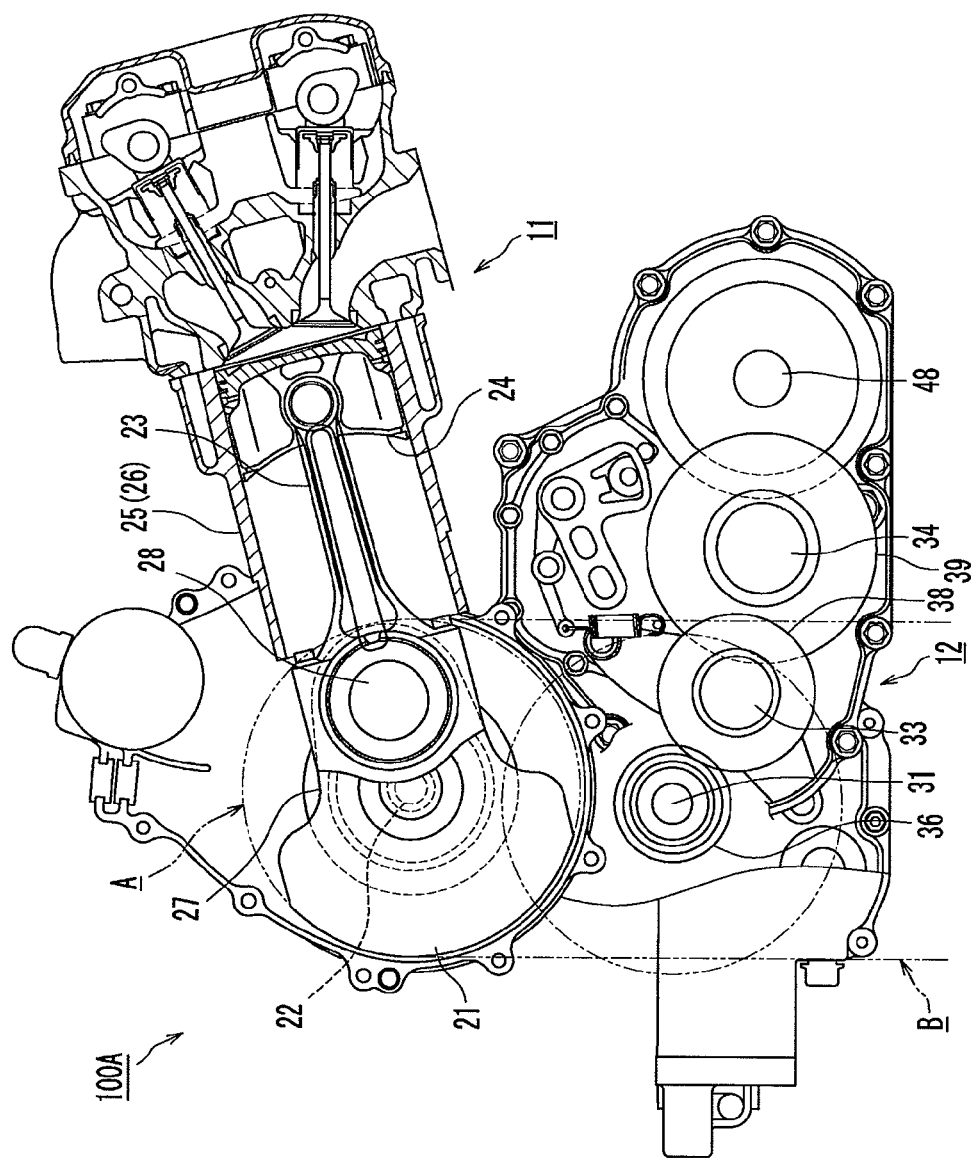

[Fig. 10]
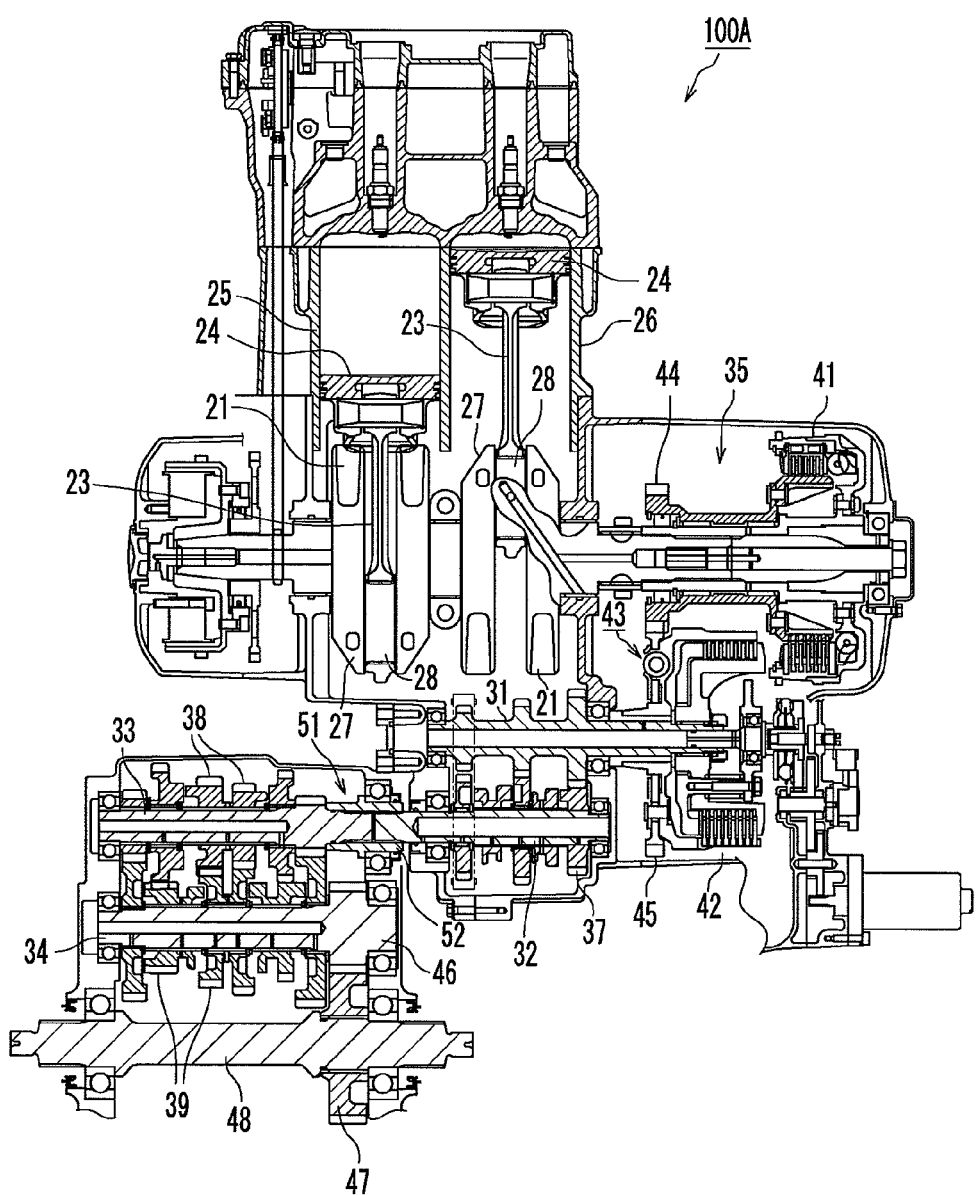

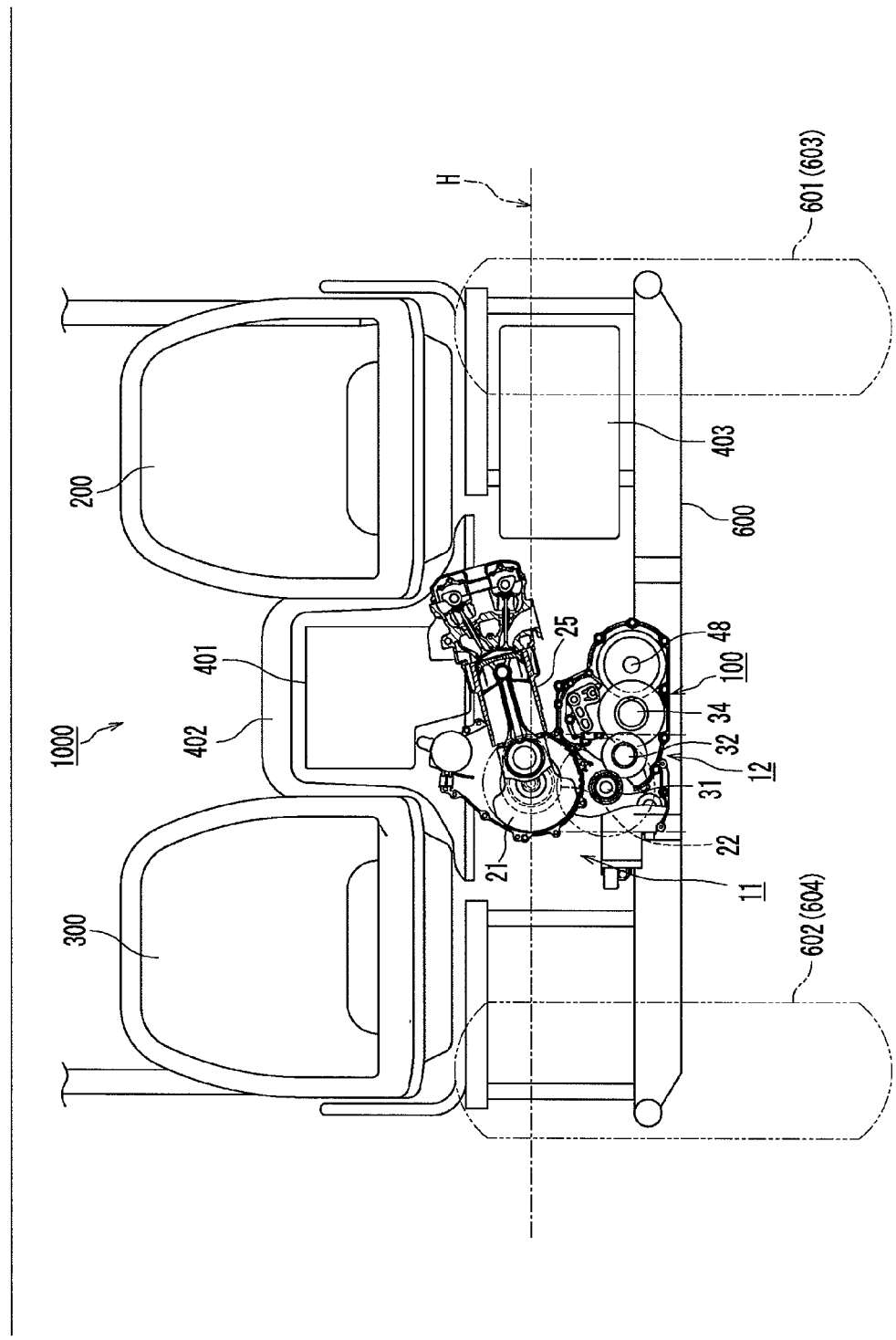
[Fig. 11]

VEHICLE

BACKGROUND OF THE INVENTION

1. Field of the Invention

The present invention relates to the arrangement of a power unit within a vehicle, such as a small-sized utility vehicle.

2. Description of the Related Art

An example of a small-sized utility vehicle is disclosed in U.S. Patent Application Publication No. 2005/0173177. The small-sized utility vehicle disclosed in U.S. Patent Application Publication No. 2005/0173177 includes a vehicle body formed of a relatively simple body frame structure and wheels attached to the vehicle body on the left and right corners of both the front and rear of the vehicle. A power unit, such as an engine and a transmission, is disposed in the space extending between the center of the vehicle body and the portion where the rear wheels are disposed. Seats and a load carrier, bed or platform are installed above the space in which the power unit is disposed. Such a small-sized utility vehicle is used in various applications, such as in agricultural settings, operation on rough terrain, and the like.

SUMMARY OF THE INVENTION

In one aspect, the vehicle includes front and rear wheels on the right and left sides of a body of the vehicle. A seat is located substantially midway between the front and rear wheels. At least portion of a power unit is disposed in the space under the seat. The power unit includes an engine having a crank shaft and a transmission to which power is input from the output portion of the engine through a first power train. The crank shaft includes a rotational mass and at least a portion of the transmission is positioned in a space below a swept area of the rotational mass. In one arrangement, the rotational mass is a counterweight of the crank shaft.

One aspect of a preferred embodiment involves the engine including a connecting rod coupled to the crank shaft. A piston is coupled to the connecting rod and a cylinder supports the piston for reciprocating motion. The axis of the cylinder is inclined relative to the horizontal direction of the vehicle.

Another aspect of a preferred embodiment involves the transmission being connected to the crank shaft through the first power train. The transmission includes a drive shaft having a drive gear and a driven shaft having a driven gear that engages the drive gear. At least part of the drive shaft or the driven shaft is situated in the space below a swept area of the rotational mass.

Yet another aspect of a preferred embodiment involves the seat being disposed on each of the right and left sides of the vehicle, and a cover that covers the space in which the power unit is disposed. The cover is positioned between the right and left seats. In such an arrangement, an engine air intake device is disposed below the cover.

In one aspect of a preferred embodiment, a fuel tank that stores fuel to be supplied to the engine may be disposed in the space under the seat.

BRIEF DESCRIPTION OF THE DRAWINGS

These and other features, aspects and advantages of the present invention are described below with reference to drawings of preferred embodiments, which are intended to illustrate, but not to limit the present invention. The drawings include eleven (11) figures.

FIG. 1 is a side view of a small-sized utility vehicle having certain features, aspects and advantages of the present invention.

FIG. 2 is a side view of a driver's seat portion and power unit of the small-sized utility vehicle of FIG. 1.

FIG. 3 is a plan view of a seat arrangement, including the driver's seat and a passenger's seat, and the power unit of the small-sized utility vehicle of FIG. 1.

FIG. 4 is a front longitudinal cross-sectional view of the driver's seat and passsenger's seat and power unit of the small-sized utility vehicle of FIG. 1.

FIG. 5 is a front view of the power unit of the small-sized utility vehicle of FIG. 1.

FIG. 6 is an extended view of the transmission of the power unit of FIG. 5.

FIG. 7 is a plan view of the power unit of FIG. 5.

FIG. 8 is a schematic view of certain components of the power unit of FIG. 5.

FIG. 9 is a front view of a modification of the power unit of FIG. 5.

FIG. 10 is an extended view of the power unit of FIG. 9.

FIG. 11 is a front longitudinal cross-sectional view of the driver's seat and passsenger's seat of a small-sized utility vehicle including the power unit of FIG. 9.

DETAILED DESCRIPTION OF THE PREFERRED EMBODIMENT

Vehicles, such as small-sized utility vehicles, in which a power unit is disposed generally at the center of the vehicle body are being used in a variety of applications. The present inventor has conceived of such vehicles in which the seating space and the carrier size are maximized. The present inventor has also conceived of using a multi-cylinder engine to improve the performance of such small-sized utility vehicles. The present inventor has conceived of ensuring a large seating space and carrier size by housing the power unit in the space under the driver's and passenger's seats and thereby has devised an unprecedented, completely new vehicle.

Embodiments of a vehicle having certain features, aspects and advantages of the present invention is described below with reference to the drawings. It is understood that the invention is not limited to the following embodiments. In addition, components, members or portions providing the same effects, or substantially the same effects, are denoted using the same reference characters.

As shown in FIGS. 1 and 4, the vehicle 1000 includes wheels 601 to 604 on the front and rear sides as well as on the right and left sides of a vehicle body 600. As shown in FIGS. 1 to 4, a seat arrangement includes two seats 200 and 300 provided generally midway between the front wheel 601 and the rear wheel 603. In the illustrated arrangement, two separate seats 200, 300 are provided. However, in another arrangement, the seats 200, 300 may be integrated into a single structure having two seat portions. At least part of a power unit 100 is disposed in the space under the seats 200 and 300. As shown in FIG. 5, the power unit 100 includes an engine 11 having a crank shaft 22. The crank shaft 22 includes a weight 21. The power unit 100 also includes a transmission 12 to which power is input from the output portion of the engine 11 via a first power train 35. In the vehicle 1000, at least part of the transmission 12 is disposed in an area B under the crank shaft 22 having the weight 21.

In this description, the "up/down direction" or "vertical direction" of the vehicle (vehicle body) refers to the direction defined along the height direction of the vehicle. The "front/rear direction" or "longitudinal direction" of the vehicle (vehicle body) refers to the direction defined along the traveling direction of the vehicle. The "right/left direction" or "lateral direction" of the vehicle (vehicle body) refers to the direction defined along the width direction of the vehicle when facing the front of the vehicle.

In the vehicle 1000, the seats 200 and 300 are disposed on the centerline C1, or substantially on the centerline C1, of the wheelbase of the front and rear wheels 601 to 604. Thus, in this embodiment, the seats 200 and 300 are disposed on the centerline C1 of the wheelbase, and the power unit 100 is disposed in the space under the seats 200 and 300. In the vehicle 1000, heavier components, such as the power unit, preferably are integrally disposed on the centerline C1 of the wheelbase, to enhance stability during traveling. In the illustrated embodiment, although the separate seats 200 and 300 are disposed on the right and left sides, an integral bench seat may be employed as the right and left seats 200 and 300, as discussed above.

In the illustrated embodiment, the vehicle 1000 has a frame 611 and a front panel 612 attached to the vehicle body 600, as shown in FIG. 1. Differential gears 621 and 622 are also attached on the front and rear portions of the vehicle body 600. Axle shafts (not shown) are attached at the front and rear differential gears 621 and 622 in the right/left direction. The wheel rims of the wheels 601 to 604 are attached to the ends of the right and left axle shafts. An output shaft 48 of the power unit 100 transmits power to the differential gears 621 and 622 described above through a power train, such as a propeller shaft (not shown), and the power is then distributed to the right and left axle shafts (not shown) through the differential gears 621 and 622.

As shown in FIGS. 5 and 6, the power unit 100 includes the engine 11 and the transmission 12.

As shown in FIG. 5, the engine 11 includes the crank shaft 22 including a rotational mass, such as a weight 21. The weight 21 is a member that tends to smooth rotation of the crank shaft 22 by means of an inertia force. In this embodiment, the weight 21 is formed on a crank web 27 of the crank shaft 22 as a counterweight. However, in other arrangements, the weight 21 may be a flywheel, for example, or another suitable weighted member.

In the illustrated embodiment, the engine 11 includes connecting rods 23 connected to the crank shaft 22, pistons 24 connected to the connecting rods 23, and cylinders 25 and 26 that support the pistons 24 for reciprocating motion.

One end of the connecting rod 23 is rotatably connected to a crank pin 28 disposed at a position radially shifted from the axis of rotation O of the crank shaft 22 via the crank web 27. The piston 24 is connected to the end of the connecting rod 23. Each of the cylinders 25 and 26 supports the piston 24 connected to the connecting rod 23 for reciprocating motion.

As shown in FIG. 5, the illustrated engine 11 includes the two cylinders 26 and 25 and 26. That is, the illustrated embodiment employs a so-called horizontally opposed engine in which the cylinders 25 and 26 face each other with the crank shaft 22 therebetween.

As shown in FIGS. 1 and 4, the power unit 100 is configured such that the axis of the crank shaft 22 extends at least substantially in the front/rear direction of the vehicle 1000 and is disposed at least substantially along a horizontal plane H of the vehicle 1000. "The horizontal plane of the vehicle" used herein is, for example, an arbitrary plane having its origin at an arbitrary point on the vehicle 1000 and defined by the front/rear direction and the right/left direction of the vehicle 1000 described above. As described above, this embodiment employs a so-called horizontally opposed engine, so that the cylinders 25 and 26 face each other with the crank shaft 22 therebetween. The axes of the cylinders 25 and 26 extend from the crank shaft 22 in the right/left direction of the vehicle 1000 along the horizontal plane of the vehicle 1000. This configuration keeps a low profile of the engine in the power unit 100.

The transmission 12 is connected to the crank shaft 22 via a first power transmission mechanism or first power train 35, as shown in FIG. 6.

In this embodiment, the first power train 35 includes a centrifugal clutch 41 attached to the crank shaft 22, a change gear operation clutch 42 attached to a first drive shaft 31 of the transmission 12, and a second power train 43 (or power transmission mechanism) that connects the output portion of the centrifugal clutch 41 to the input portion of the change gear operation clutch 42. The second power train 43 is operated by the engagement of an output gear 44 provided at the output portion of the centrifugal clutch 41 with an input gear 45 provided at the input portion of the change gear operation clutch 42. In this embodiment, the centrifugal clutch 41 and the change gear operation clutch 42 are disposed such that their positions are shifted from each other in the axial direction of the crank shaft 22. Such a configuration allows the power unit 100 to be compact in the axial direction of the crank shaft 22 and allows the drive shafts 31 and 33 to be disposed closer to the crank shaft 22. With such an arrangement, the first power train 35 allows the power unit 100 to be compact in the front/rear and up/down directions of the vehicle 1000.

The transmission 12 includes the first drive shaft 31, a first driven shaft 32, the second drive shaft 33 and a second driven shaft 34. The first drive shaft 31 is connected to the crank shaft 22 via the first power train 35 and has a first drive gear 36. The first driven shaft 32 has a first driven gear 37 that engages the first drive gear 36. The second drive shaft 33 is connected to the first driven shaft 32 via a shaft connection element 51 such that the second drive shaft 33 and the first driven shaft 32 are coaxial. The second drive shaft 33 has a second drive gear 38. The second driven shaft 34 has a second driven gear 39 that engage the second drive gear 38.

In the illustrated embodiment, the drive gears 36, 38 and the driven gears 37, 39 are mounted on the respective shafts and secured by fastening or coupling elements, such as splines, for example. In this embodiment, the shaft connection element 51 connects the first driven shaft 32 to the second drive shaft 33 by splines formed on the shaft ends of the first driven shaft 32 and the second drive shaft 33 and mounting a sleeve 52 having splines formed on its inner circumferential surface that mate with the splines on the shaft ends of both shafts. However, the attachment of the drive gears 36, 38 and the driven gears 37, 39 to the respective shafts as well as the shaft connection element 51 is not limited to the arrangement described above. Accordingly, other suitable arrangements may be used as well. The configuration in which the first driven shaft 32 is connected to the second drive shaft 33 by the shaft connection element 51 allows the entire transmission 12 to be made compact.

Although not illustrated, the transmission 12 can switch between traveling forward and backward, change gear ratios and the like by changing relative positional relationship of the drive gears 36, 38 and the driven gears 37, 39. Such a transmission 12 is provided with a sub-transmission mechanism between the first drive shaft 31 and the first driven shaft 32 as well as a main-transmission mechanism between the second drive shaft 33 and the second driven shaft 34. These two transmission mechanisms switch between traveling forward and backward, switch between a HIGH gear and a LOW gear, and perform more detailed change gear ratio operations. The second driven shaft 34 is connected to the output shaft 48 of the power unit 100 via gears 46 and 47.

In the illustrated embodiment, as shown in FIG. 6, the first drive shaft 31, the first driven shaft 32, the second drive shaft 33 and the second driven shaft 34 are disposed parallel to the crank shaft 22. The first driven shaft 32 is connected to the second drive shaft 33 in the axial direction.

The power unit 100 is disposed in the vehicle 1000 such that at least a portion of the transmission 12 is situated in the area B under the crank shaft 22 including the weight 21 or below a swept area of the weight 21.

Specifically, in this embodiment, as shown in FIG. 5, the weight 21 is attached to the crack web 27 as a counterweight. In this case, when viewed from the axial direction of the crank shaft 22, the position of the weight 21 varies when the crank shaft 22 rotates. Thus, as shown in FIG. 5, when viewed from the axial direction of the crank shaft 22, "the area under the crank shaft including the weight 21" may be considered to be the area B under the rotational path A of the crank shaft 22 including the weight 21. The outer diameter of the rotational path A may be defined by the maximum outer diameter of the crank shaft 22 including the weight 21 that rotates around the axis of rotation O of the crank shaft 22, or the "swept" area of the weight 21.

As shown in FIGS. 1 and 4, the crank shaft 22 is oriented in the front/rear direction of the vehicle 1000 and disposed along the horizontal plane H of the vehicle 1000. The cylinders 25 and 26 face each other with the crank shaft 22 therebetween. The power unit 100 is disposed in the vehicle 1000 such that at least a portion of the transmission 12 is situated in the area B under the crank shaft 22 including the weight 21. Since at least part of the transmission 12 is thus disposed in the area B, the engine 11 overlaps the transmission 12 in the plan view. Such a configuration makes the power unit 100 compact in the plan view.

Furthermore, in the illustrated arrangement, at least portion of the drive shaft 31 including the first drive gear 36 or the driven shaft 32 including the driven gear 37 of the transmission 12 is situated in the area B under the crank shaft 22 including the weight 21.

"A drive shaft including a drive gear" used herein may be considered to include all drive gears when the drive shaft includes a plurality of drive gears. "A driven shaft including a driven gear" used herein may be considered to include all driven gears when the driven shaft includes a plurality of driven gears.

Thus, the power unit 100 is configured such that at least a portion of the transmission 12 is disposed in the area B under the crank shaft 22 including the weight 21. A situation where at least part of the transmission is not disposed in the area under the crank shaft including the weight 21 (or the swept area of the rotational mass) is, in other words, a situation where the crank shaft does not overlap with the transmission in the plan view of the vehicle and results in a power unit that is not compact in the plan view.

However, with an arrangement wherein the transmission mechanism includes a drive shaft having a drive gear and a driven shaft connected to the drive shaft through a driven gear, which meshes with the drive gear as shown in FIG. 8, preferably, drive shafts 31a having a drive gear 36a, or driven shafts 32a having a driven gear 37a are at least partially disposed inside the region B vertically below the crank shaft 22 described above. Accordingly, all parts of the drive shafts 31a having the drive gear 36a or all parts of the driven shafts 32a having the driven gear 37a may be not necessarily disposed inside the region B vertically below the crank shaft 22.

In addition, A in FIG. 8 denotes a turning locus of the crank shaft 22 including the weights 21 or a swept area of the weight 21.

Moreover, with either of the drive shafts 31a and the driven shafts 32a, it suffices that the drive shafts 31a having the drive gear 36a or the driven shafts 32a having the driven gear 37a be at least partially disposed inside the region B vertically below the crank shaft 22. Accordingly, the other of the shafts may not be arranged in the region B vertically below the crank shaft 22. For example, in FIG. 8, with the drive shafts 31a, the drive shafts 31a having the drive gear 36a are partially disposed inside the region B vertically below the crank shaft 22, but the driven shafts 32a having the driven gear 37a are not disposed inside the region B vertically below the crank shaft 22. The drive shaft and the driven shaft may be arranged in this manner.

As in the power unit 100 of the above-described embodiment, when the power unit 100 is disposed such that the crank shaft 22 is horizontally oriented and at least part of the transmission 12 is situated in the lower area B described above, the crank shaft 22 overlaps with the transmission 12 in the plan view, as shown in FIG. 7, so that the power unit 100 will be compact.

A situation where at least part of the transmission 12 is disposed in the area B under the crank shaft 22 including the weight 21 includes, for example, as in this embodiment, the situation where at least part of the drive shafts 31 and 33 including the drive gears 36 and 38 or the driven shafts 32 and 34 including the driven gears 37 and 39 of the transmission 12 is situated in the above-described lower area B.

That is, as shown in FIG. 5, when the drive shaft 31 is disposed in the above-described lower area B, the driven shaft 32 is connected to the drive shaft 31 by engaging the driven gear 37 with the drive gear 36. Thus, the area where the driven shaft 32 is disposed is restricted and determined by the position where the drive shaft 31 is disposed. Thus, when at least part of the drive shaft 31 including the drive gear 36 or the driven shaft 32 including the driven gear 37 is situated in the above-described lower area B, the power unit 100 will be more compact in the plan view of the vehicle 1000 compared to the power unit configured otherwise.

In this embodiment, as shown in FIGS. 5 and 7, the first drive shaft 31 including the first drive gear 36 is situated in the area B under the crank shaft 22 including the weight 21. The first driven shaft 32 including the first driven gear 37 and the second drive shaft 33 including the second drive gear 38 are also largely situated in the area B under the crank shaft 22, although part of these shafts and gears protrudes from the region B under the crank shaft 22. Thus, in this embodiment, at lease part of the drive shafts including the drive gears or the driven shafts including the driven gears is disposed in the above-described area B under the crank shaft 22. Thus, as shown in FIG. 7, the power unit 100 will be more compact in the plan view of the vehicle 1000.

Furthermore, as shown in FIG. 5, the drive shafts 31 and 33 or the driven shafts 32 and 34 are disposed such that the shaft portions excluding the drive gears 36 and 38 or the driven gears 37 and 39 do not overlap each other in the up/down direction of the vehicle. Therefore, the power unit 100 is compact in the up/down direction of the vehicle 1000.

Thus, as shown in FIGS. 1 to 4, in the vehicle 1000 having the transmission 12 situated in the lower portion of the power unit 100 and the engine 11 situated in the upper portion of the power unit 100, by disposing the crank shaft 22 such that it is oriented to the front/rear direction of the vehicle 1000 and disposing the cylinders 25 and 26 such that their axes are oriented to the width direction of the vehicle 1000, the power unit 100 can be housed in the space under the driver's seat 200 and the passenger's seat 300 of the small-sized utility vehicle 1000. Particularly, in this embodiment, the power unit 100 is configured to be compact in the axial direction of the crank shaft 22. Thus, as shown in the figures, the power unit 100 can be housed in the space under the driver's seat 200 and the passenger's seat 300 such that the power unit 100 does not significantly project rearward from the driver's seat 200 and the passenger's seat 300. Therefore, the space behind the driver's seat 200 and the passenger's seat 300 of the small-sized utility vehicle 1000 can be effectively used.

In the embodiment shown in FIGS. 1 to 4, the seats 200 and 300 are disposed on the right and left sides in the vehicle 1000, respectively, and a cover 402 that covers the portion where the power unit 100 is disposed is attached between the right seat 200 and the left seat 300. An intake accumulator 401 (or air cleaner box) that acts as an intake device for delivering air to the engine 11 is installed below the cover 402. A fuel tank 403 for storing fuel supplied to the engine is disposed in the space under the seat 200, 300. That is, in this embodiment, in the space under the driver's seat 200 and the passenger's seat 300 of the small-sized utility vehicle 1000, the power unit 100 is disposed in the area slightly closer to the passenger's seat 300 from the center. Then, the intake accumulator 401 is installed in the space covered by the cover 402 between the driver's seat 200 and the passenger's seat 300 of the small-sized utility vehicle 1000. In the space under the driver's seat 200 and the passenger's seat 300, the fuel tank 403 is installed in a vacant space closer to the driver's seat 200. By thus changing the structure of the power unit 100 and the layout of the intake accumulator 401 and the fuel tank 403, even wider space behind the driver's seat 200 and the passenger's seat 300 can be used in the small-sized utility vehicle 1000.

While the vehicle according to one embodiment of the invention has been described, the vehicle according to the invention is not limited to the above embodiment. For example, the structure of the engine, the structure of the transmission and the like are presented only by way of example, and various changes can be made thereto.

Moreover, the weight 21 is the portion/member that functions as a counterweight formed on the crank shaft. Although in this embodiment, the weight 21 is illustrated as being formed on the crank web 27, the way the weight 21 is formed is not limited thereto. The weight 21 may be formed integral with the crank shaft, or a member separate from the crank shaft may be attached to the crank shaft. Alternatively, the weight 21 may be disposed at a location other than the crank web of the crank shaft 22. The weight 21 may also include other rotational masses, such as a flywheel, for example. The above embodiment of the first power train 35 that connects the crank shaft 22 to the transmission 12 is presented only by way of example, and the power train 35 is not limited to the above embodiment.

The vehicle of the invention is not limited to above-described vehicle in which the axis of the crank shaft 22 of the power unit 100 extends in the front/rear direction of the vehicle 1000 and the power unit 100 is disposed along the horizontal plane H of the vehicle 1000. Although not illustrated, the axis of the crank shaft may extend in the right/left direction of the vehicle. Alternatively, the crank shaft may be disposed such that its axis inclines about 45 degrees or smaller with respect to the horizontal plane of the vehicle. Considering the height of the space under the seats 200 and 300 of the vehicle 1000, the height of the power unit 100 is preferably low. To this end, the crank shaft may be more preferably disposed such that its axis inclines about 20 degrees or less with respect to the horizontal plane of the vehicle. Still more preferably, the crank shaft may be disposed such that its axis inclines about 10 degrees or less with respect to the horizontal plane of the vehicle.

Although the above embodiment illustrates the vehicle in which the horizontally opposed power unit 100 is employed and the cylinders 25 and 26 are disposed such that their axes lie along the horizontal plane H of the vehicle 1000, the vehicle of the invention is not limited thereto. Although not illustrated, the axes of the cylinders may incline with respect to the up/down direction of the vehicle. In this way, the height of the power unit becomes lower than the case where the axes of the cylinders do not incline with respect to the up/down direction of the vehicle, that is, the case where the cylinders are disposed such that their axes lie along the up/down direction of the vehicle.

Considering the height of the space under the seats 200 and 300 of the vehicle 1000, the height of the power unit 100 is preferably low. To this end, although not illustrated, the axes of the cylinders may be inclined about 45 degrees or less with respect to the horizontal plane of the vehicle. More preferably, the axes of the cylinders may be inclined about 20 degrees or less with respect to the horizontal plane of the vehicle. Still more preferably, the axes of the cylinders may be inclined about 10 degrees or less with respect to the horizontal plane of the vehicle.

The above embodiment of the power unit 100 illustrates a vehicle 1000 that employs the so-called horizontally opposed power unit 100 including at least two cylinders 25 and 26 that face each other with the crank shaft 22 therebetween. Employing the horizontally opposed power unit 100 allows a lower height of the power unit 100 and reduced vibration caused by the engine operation. Since the power unit is disposed under the seats, employing such a horizontally opposed power unit to reduce the vibration can improve the riding quality of the vehicle.

In the above embodiment, the horizontally opposed power unit 100 is employed and the cylinders 25 and 26 are disposed such that their axes lie along the horizontal plane of the vehicle 1000. This lowers the height of the power unit 100 when it is disposed in the vehicle 1000.

When a multi-cylinder power unit provided with at least two cylinders 25 and 26 is to be employed, a power unit 100A in which the cylinders 25 and 26 are disposed on one side of the crank shaft 22 and inclined about 20 degrees or less with respect to the horizontal plane of the vehicle 1000 may be used as shown in FIGS. 9 and 10. In this case, for example, as shown in FIG. 11, the power unit 100A may be disposed such that the crank shaft 22 extends in the front/rear direction of the vehicle 1000 and the axes of the cylinders 25 and 26 extend in the right/left direction of the vehicle 1000. In this way, the outer shape of the power unit in the plan view can be compact in the right/left direction of the vehicle compared to the horizontally opposed power unit provided that both power units have the same engine displacement. The axes of the cylinders 25 and 26 may be inclined about 20 degrees or less with respect to the horizontal plane of the vehicle. When the axes of the cylinders are inclined, for example, 10 degrees or less with respect to the horizontal plane of the vehicle, the power unit can be more compact in the up/down direction of the vehicle.

Although not illustrated, at least part of the drive shafts including the drive gears and at least part of the driven shafts including the driven gears may be situated in the area under the crank shaft including the weight or under the cylinders. In this way, the transmission is disposed such that it overlaps with the engine in the up/down direction of the vehicle. The entire power unit becomes compact in the plan view of the vehicle.

At least part of the drive shafts including the drive gears and at least part of the driven shafts including the driven gears may be situated in the area under the crank shaft including the weight. In this way, the shafts of the transmission can be integrated under the crank shaft of the engine, so that the entire power unit can be compact in the plan view of the vehicle.

In the above embodiment, as shown in FIGS. 5 and 6, the drive shaft 31 is disposed parallel to the crank shaft 22. That is, the crank shaft 22 is disposed in the front/rear direction of the vehicle 1000 and along the horizontal plane of the vehicle 1000. However, the vehicle according to the invention is not limited to such an embodiment. The axes of the drive shafts may extend in the front/rear direction of the vehicle or in the right/left direction of the vehicle. Alternatively, the axes of the drive shafts may be inclined about 45 degrees or less with respect to the horizontal plane of the vehicle. Considering the height of the space under the seats in order to make the power unit more compact in the up/down direction of the vehicle, the axes of the drive shafts may more preferably be inclined about 20 degrees or less with respect to the horizontal plane of the vehicle. Still more preferably, the axes of the drive shafts may be inclined about 10 degrees or less with respect to the horizontal plane of the vehicle.

The cover disposed between the right and left seats is not necessarily required when a bench-shaped seat in which the right and left seats are integrated is employed. The air intake accumulator and the fuel tank disposed in the space under the seats may be disposed at appropriate positions under the seats according to the shape of the space under the seats and the position where the power unit is disposed. Particularly, the fuel tank may be appropriately shaped according to the vacant space under the seats.

The vehicle according to the invention in which the power unit is housed in the space under the seats in a compact manner as described above is suitable for use in a small-sized utility vehicle. The vehicle according to the invention can be broadly applied to small-sized vehicles of similar types as well as small-sized utility vehicles.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In particular, while the present vehicle has been described in the context of particularly preferred embodiments, the skilled artisan will appreciate, in view of the present disclosure, that certain advantages, features and aspects of the vehicle may be realized in a variety of other applications, many of which have been noted above. Additionally, it is contemplated that various aspects and features of the invention described can be practiced separately, combined together, or substituted for one another, and that a variety of combination and subcombinations of the features and aspects can be made and still fall within the scope of the invention. Thus, it is intended that the scope of the present invention herein disclosed should not be limited by the particular disclosed embodiments described above, but should be determined only by a fair reading of the claims.

What is claimed is:

1. A vehicle, comprising:
    a vehicle body;
    a set of front wheels and a set of rear wheels, each of the front wheels and rear wheels comprising a left wheel and a right wheel on respective left and right sides of the vehicle body;
    a seat positioned substantially midway between the front wheels and the rear wheels; and
    a power unit arranged such that at least a portion of the power unit is disposed in a space below the seat, the power unit comprising:
        an engine including a crank shaft and a rotational mass fixed for rotation with the crank shaft; and
        a transmission to which power is input from an output of the engine through a first power train, the transmission including a plurality of drive shafts and a plurality of driven shafts; wherein
    at least a portion of the transmission is arranged in a space directly below a swept area of the rotational mass, the swept area of the rotational mass being defined by a maximum outer diameter of a rotation path of the crank shaft and the rotational mass, such that each of the plurality of drive shafts and the plurality of driven shafts are arranged at a position lower than the swept area of the rotational mass;
    none of the plurality of drive shafts and the plurality of driven shafts overlap each other in an up/down direction of the vehicle;
    the plurality of drive shafts include a first drive shaft and a second drive shaft and the plurality of driven shafts include a first driven shaft and a second driven shaft; and
    the first drive shaft is coupled to the crank shaft, the first driven shaft is coupled to the first drive shaft, the second drive shaft is coupled to the first driven shaft, and the second driven shaft is coupled to the second drive shaft.

2. The vehicle of claim 1, wherein the axis of the crank shaft extends in a longitudinal direction of the vehicle.

3. The vehicle of claim 1, wherein the crank shaft is disposed such that the axis of the crank shaft defines an angle of 45 degrees or less with respect to a horizontal plane of the vehicle.

4. The vehicle of claim 1, wherein the crank shaft is disposed such that the axis of the crank shaft defines and angle of 20 degrees or less with respect to a horizontal plane of the vehicle.

5. The vehicle of claim 1, wherein the engine further comprises at least one cylinder, the at least one cylinder including an associated connecting rod connected to the crank shaft, a piston connected to the connecting rod, wherein the at least one cylinder supports the piston for reciprocating motion, and wherein the axis of the at least one cylinder is inclined with respect to a horizontal plane of the vehicle.

6. The vehicle of claim 5, wherein the axis of the at least one cylinder is inclined at an angle of no more than 45 degrees with respect to the horizontal plane of the vehicle.

7. The vehicle of claim 5, wherein the axis of the at least one cylinder is inclined at an angle of no more than 20 degrees with respect to the horizontal plane of the vehicle.

8. The vehicle of claim 5, wherein the at least one cylinder comprises at least a first cylinder and a second cylinder, wherein the first cylinder and the second cylinder are arranged substantially opposed to one another with the crank shaft therebetween.

9. The vehicle of claim 5, wherein the at least one cylinder comprises at least a first cylinder and a second cylinder, wherein the first cylinder and the second cylinder are arranged on one side of the crank shaft and inclined at an angle of no more than 20 degrees with respect to a horizontal plane of the vehicle.

10. The vehicle of claim 5, wherein
the transmission is connected to the crank shaft through the first power train;
the first drive shaft includes a drive gear; and
the first driven shaft includes a driven gear that engages the drive gear; wherein at least a portion of both of the first drive shaft and the first driven shaft are arranged in the space directly below the swept area of the rotational mass.

11. The vehicle of claim 10, wherein at least a portion of the first drive shaft including the drive gear and at least a portion of the first driven shaft including the driven gear are arranged in the space directly below the swept area of the rotational mass.

12. The vehicle of claim 1, wherein
the transmission is connected to the crank shaft through the first power train;
the first drive shaft includes a drive gear; and
the first driven shaft includes a driven gear that engages the drive gear; wherein
at least a portion of at least one of the first drive shaft and the first driven shaft is arranged in the space directly below the swept area of the rotational mass.

13. The vehicle of claim 12, wherein the axis of the first drive shaft extends in a longitudinal direction of the vehicle.

14. The vehicle of claim 13, wherein the axis of the first drive shaft is inclined at an angle of no more than 45 degrees with respect to a horizontal plane of the vehicle.

15. The vehicle of claim 12, wherein the first drive shaft is oriented parallel to the crank shaft.

16. The vehicle of claim 12, wherein the first power train comprises:
a centrifugal clutch coupled to the crank shaft;
a change gear operation clutch coupled to the first drive shaft;
a second power train that couples the output portion of the centrifugal clutch to the input portion of the change gear operation clutch; wherein
the centrifugal clutch and the change gear operation clutch are offset from one another in an axial direction of the crank shaft.

17. The vehicle of claim 1, wherein the first drive shaft is coupled to the crank shaft through the first power train, the first drive shaft including a first drive gear;
the first driven shaft includes a first driven gear that engages the first drive gear;
the second drive shaft is coupled to the first driven shaft through a shaft connection element such that the second drive shaft and the first driven shaft are coaxial, the second drive shaft including a second drive gear; and
the second driven shaft includes a second driven gear that engages the second drive gear; wherein
at least one of the first and second drive shafts and the first and second driven shafts is arranged in the space directly below the swept area of the rotational mass.

18. The vehicle of claim 1, wherein the seat comprises a driver seat portion on the right side of the vehicle and a passenger seat portion on the left side of the vehicle, and further comprises a cover that covers the power unit attached between the right and left seat portions.

19. The vehicle of claim 18, wherein an engine air intake device is disposed below the cover.

20. The vehicle of claim 1, wherein a fuel tank that stores fuel to be supplied to the engine is disposed under the seat.

21. The vehicle of claim 1, wherein the rotational mass comprises a counterweight of the crank shaft.

* * * * *